Figure 1:
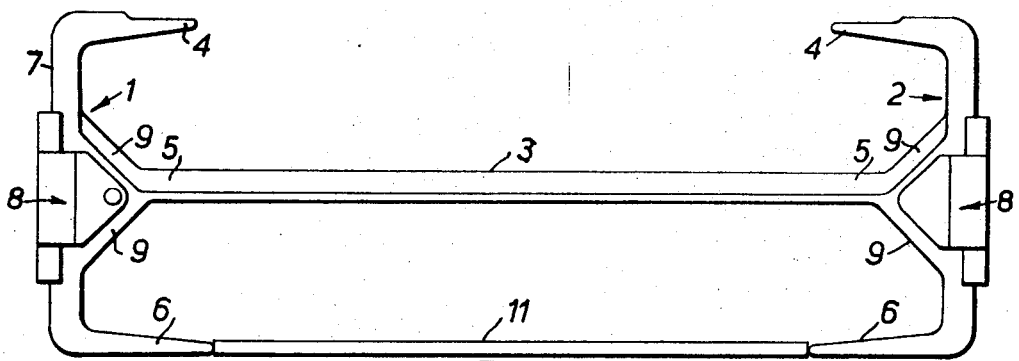

United States Patent
Paul

[15] 3,680,682
[45] Aug. 1, 1972

[54] CHAIN CONVEYORS

[72] Inventor: Thomas Campbell Paul, Worcester, England

[73] Assignee: Dowty Meco Limited, Meco Works, Worcester, England

[22] Filed: Nov. 24, 1970

[21] Appl. No.: 92,459

[30] Foreign Application Priority Data

Dec. 13, 1969  Great Britain.............60,898/69

[52] U.S. Cl.................................................198/204
[51] Int. Cl............................................B65g 15/60
[58] Field of Search...............198/204, 171, 168, 195

[56] References Cited

UNITED STATES PATENTS 3,583,552   6/1971   Renwick.......................198/195
3,563,367   2/1971   Breuer et al..................198/204

FOREIGN PATENTS OR APPLICATIONS 892,582   3/1962   Great Britain................198/204

Primary Examiner—Evon C. Blunk
Assistant Examiner—H. S. Lane
Attorney—Young & Thompson

[57] ABSTRACT

A conveyor having a plurality of pans secured together in end to end relationship, each pan comprising a pair of so-called "sigma" members arranged in parallel side-by-side relation. Two adjacent pans are secured together by a keeper device fitting within adjacent V-section grooves in the outer surfaces of two adjacent "sigma" members. The keeper device is loosely retained in association with the "sigma" members.

4 Claims, 6 Drawing Figures

PATENTED AUG 1 1972  3,680,682

INVENTOR
THOMAS CAMPBELL PAUL
BY
Young + Thompson
ATTORNEYS

CHAIN CONVEYORS

This invention relates to a chain conveyor in which a plurality of channel like pans are secured loosely in end to end relation to provide upper and lower guide paths for one or more chains and scraper bars carried thereby. Movement of the chains and scraper bars along the upper guide path conveys loose material such as coal along the guide path. The invention is more particularly concerned with such a conveyor in which two or more pans are of the kind comprising a pair of sigma section side members (referred to for convenience as sigma members) arranged in parallel side-by-side relation with the flanges of one sigma member directed towards the corresponding flanges of the other sigma member and with a flat rigid sheet or deck secured between the central flanges. For convenience these pans will be referred to as pans of the kind referred to.

With pans of the kind referred to upper and lower guide paths are provided between the sigma members of the upper and lower sides of the deck.

The present invention has for its object to secure together pans of the kind referred to in loose end to end relation so that the pans have a limited degree of movement relative to one another enabling the line of pans forming the conveyor to take up a line which may be straight or slightly curved.

The present invention comprises a conveyor having a plurality of pans secured together in end to end arrangement in which each pan comprises a pair of sigma members arranged in parallel side-by-side relation with the flanges of one sigma member directed towards the corresponding flanges of the other sigma member and a flat rigid sheet secured between the central flanges to provide upper and lower guide paths for one or more chains and scraper bars, the means securing two adjacent pans together comprising at least one keeper device fitting partly or wholly within the adjacent V-section grooves formed in the outer surfaces of two adjacent sigma members of the two pans, means being provided in the V-section grooves to retain the keeper device loosely attached to the two adjacent sigma members.

Preferably two keepers are provided to secure two adjacent pans together located one on either side of the pans partly or wholly within the V-section grooves of the adjacent sigma members.

Each keeper device may comprise a single piece of metal having a central stem carrying a pair of spaced enlargements.

Each keeper may engage within a V-section groove by means of a slotted flange secured within the groove capable of engaging a head of the keeper.

Each keeper may be loosely retained in position by means of a bendable wire or rod engageable both in the sigma section and the keeper and bent over to retain the keeper. Each keeper may include a groove to accommodate a part of a bent over wire or rod.

Locating means other than a keeper or keepers may engage between the adjoining ends of two adjacent pans to prevent relative movements between the ends transversely to the length of the pans.

Such locating means may comprise a part of the rigid sheet metal member of one pan extending beyond the sigma member secured thereto and capable of entering the space between the sigma members of the adjoining pan. The said part of the rigid sheet of one pan may be slightly offset so as to fit against the rigid sheet of the adjoining pan and at the same time provide a substantially continuous surface on the upper side of said rigid sheets.

Figure 2:
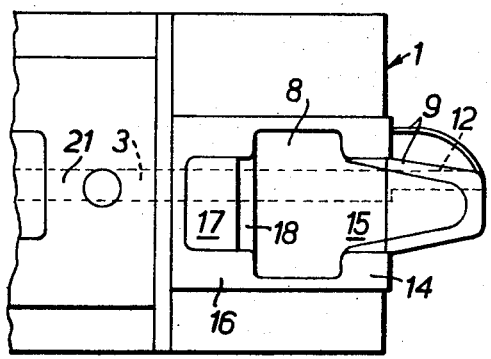
Figure 3:
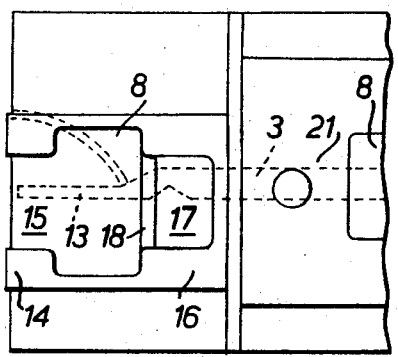
Figure 4:
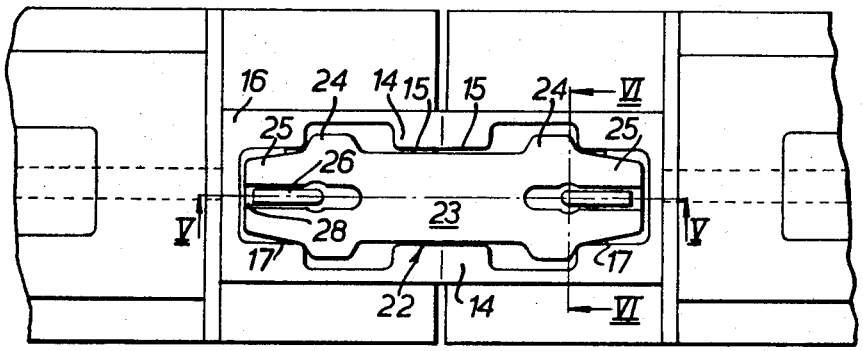
Figure 5:
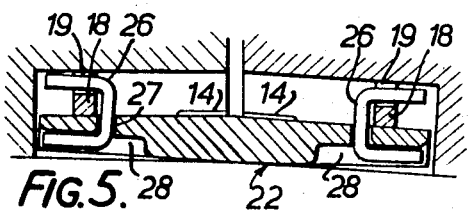
Figure 6:
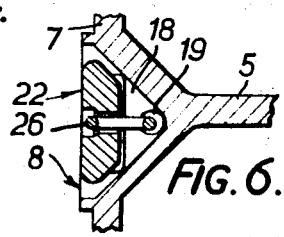

One embodiment of the invention will now be described with reference to the accompanying drawings, in which FIG. 1 is an end elevation of a conveyor pan including sigma members, FIGS. 2 and 3 are elevations of the end portions of two adjacent pans before joining together, FIG. 4 is an elevation of the ends of two adjacent pans as shown in FIG. 3 but joined together by a keeper device, FIG. 5 is a cross section on the line V—V of FIG. 4, and FIG. 6 is a cross section on the line VI—VI of FIG. 4.

The illustrated embodiment of the invention is for use in an armoured flexible conveyor used in a coal mine for conveying coal when excavated. The conveyor comprises a line of exactly similar pans whose end elevation appears in FIG. 1. Each pan is comprised by a pair of sigma members 1 and 2 secured together by a flat deck 3. The sigma members 1 and 2 are each of substantially constant cross section throughout its length. Sigma member 1 includes an upper, a central and a lower inwardly directed flange respectively 4, 5 and 6, a side wall 7 and a V-groove 8 within the side wall 7, the walls 9 of the V-groove joining to the central flange 5. The sigma member 2 is of exactly the same construction as sigma member 1 and the various parts thereof have been given the same reference numerals. The three flanges 4, 5 and 6 of one sigma member are directed towards similar flanges of the other sigma members. The deck 3 is secured by welding between the central flanges 5. A cover plate 11 may be secured by welding between the lower flanges 6 in order to enclose the return guide path for the chains and scraper bars. However, the cover 11 may be omitted. The pans when in use are intended to stand on the floor or ground surface, the flanges 6 and cover 11 directly contacting the ground so that the deck is horizontal or approximately so. The space above the deck 3 enclosed by the upper flanges 4 and the wall 7 forms the upper guide path along which loose material such as coal is conveyed by the chains and scraper bars. At the ends of the conveyor, sprockets or the like are provided to enable the chain to return along the lower guide path formed under the deck 3 and enclosed by the walls 7 and lower flanges 6.

FIGS. 2 and 3 show elevations of adjacent ends of a pair of pans which are to be joined together. For purposes of continuity the decks 3 are provided with upper and lower off-set portions 12 and 13 which fit one above the other when the pans are joined together to form a continuous deck portion. The off-set portion 12 of the deck projects from its end of the sigma members, this projecting portion extending partly to the walls 9 of the V-grooves 8. While to all intents and purposes the sigma members are of constant cross section throughout their length, the V-grooves 8 are formed somewhat differently at their end portions to facilitate the insertion and retaining of the keeper devices. For this purpose the extreme end of the V-grooves 8 are each provided with a substantial flange 14 which includes a slot 15 opening outwardly. At a position spaced from the flange 14 a further flange 16 is provided across the V-groove 8 having an outwardly directed each 17. Across the base of the slot 17 a narrow auxiliary flange 18 is positioned through which a small hole 19 is formed. At various positions on the length of the pan the sigma members are provided with flanges across the V-section groove such for example as the flange 21, the purpose of which is to facilitate the attachment of auxiliary apparatus to the conveyor pans. Such auxiliary apparatus might comprise spill plates, the function of which is to prevent the coal moving along the conveyor from spilling over the edge of the pans.

The keeper device 22 appears in FIGS. 4, 5 and 6. The keeper device is a single piece of metal of substantially uniform thickness and shaped to provide a central stem 23 capable of fitting in the slots 15, two enlargements or heads 24 capable of fitting in the grooves 8, but incapable of passing through the slots 15 and a pair of reduced end portions 25 capable of fitting in the slots 17. In order to retain the keeper device 22 in its operative position, as shown in FIG. 4, a pair of wire retainers 26 are provided. Each of these wire retainers comprises a piece of steel wire or rod bendable by means of a hammer or the like. When each rod 26 is in its operative position it takes the form of a U, one limb of the U extending through the hole 19 in flange 18, the base of the U extending through a hole 27 in the keeper device and the other limb of the U lying in a groove 28 in the surface of the keeper device.

In order to assemble two pans together in end to end relation the two ends are brought together as shown in FIGS. 2 and 3 and then brought finally together so that the two off-set deck portions 12 and 13 overlap one another. A pair of wires 26 are then inserted in the two holes 19 and the free ends of the wire are bent by means of a hammer to assume a position at right angles to the length of the pans. The keeper device 22 is then offered into position, the projecting ends of the rod 26 passing through the holes 27 in the keeper device so that the stem 23 thereof enters into the two slots 15 in the flanges 14 and the heads 24 lie between the flanges 14 and 16. By the use of a hammer the projecting ends of the wires 26 are bent over to lie in the grooves 28. The process is then repeated to attach the keeper device in the V-grooves on the opposite side of the pans. When the two keeper devices are in position the two pans are effectively secured together in a manner which provides for a limited degree of relative movement between the pans. More particularly the pans may be pulled apart a slight degree, the limit occurring when the enlargements 24 make contact with the flanges 14. It is more particularly possible with this method of attachment for the pans to be adjusted relatively to one another by a slight angle and the view in FIG. 5 shows the pan ends adjusted relatively to one another by this small angle. The rods 26 by virtue of the fact that one limb thereof engages in the holes 19 permit lengthwise movement of the keeper devices in the V-grooves 8. Any tendency for one pan to move sideways relative to an adjacent pan is resisted by the engagement of a projecting deck end 12 within the co-operating end of the adjoining pan and it therefore follows that little or no force can be applied to the keeper devices 22 that would cause the rods 26 to bend towards an open position and so allow the keeper devices to move out of their operative positions.

The keeper devices proposed are located for the most part within the V-grooves normally provided in the sigma members and cause little projection beyond the normal width of the conveyor pans. When it is desired to dismantle a conveyor the wires 26 are easily removed by the use of simple tools such as a hammer or a lever, it merely being necessary to straighten the ends of the rods 26 contained within the grooves 28 so that the keeper devices can be moved out of their operative position.

While the rods 26 form a most convenient way of locking the keeper devices in position it is within the scope of the present invention to employ alternative locking devices. For example simple screw-threaded bolts may extend through slots in the keeper devices into the sigma members to retain the keeper devices in position and still permit the limited relative movement between adjacent pans.

I claim:
1. In a conveyor having:
   a. a plurality of pans secured together in end-to-end relation,
   b. each pan comprising a pair of sigma section members arranged in parallel, spaced relation with the flanges of one sigma section member directed towards the corresponding flanges of the other sigma section member and with a rigid sheet secured to and extending between the central flanges of the two sigma section members,
   c. a V-section groove on the outer surface of each sigma section member,
   d. engagement means for preventing relative horizontal transverse movement between each pair of adjacent pan ends, and
   e. keeper devices for limiting relative longitudinal movement between said pan ends, each keeper device being disposed within the adjoining V-section grooves of the associated pans and being held therein by retaining means, the improvement wherein,
   f. each keeper device comprises a central stem extending between a pair of spaced enlargements which have a vertical dimension greater than the vertical dimension of the central stem, and
   g. flange means are provided at the ends of the V-section grooves, the flange means at each end of each groove comprising a pair of vertically spaced abutment formations between which the central stem of the associated keeper device is a loose fit, the vertical spacing of the abutment formations being less than the vertical dimensions of the enlargements of said keeper device and the abutment formations cooperating with the enlargements to limit longitudinal movement of the keeper device relative to each of the two associated pans,
   h. cooperation between each flange means and the associated keeper device being such that interengagement thereof does not prevent movement of the keeper device outwardly of the associated groove and in a transverse horizontal direction, i. the retaining means associated with each keeper device comprising a pair of releasable coupling means, one extending between each end of the keeper device and abutment means within the associated V-section groove, said releasable coupling means constituting the sole means preventing transverse horizontal movement of the keeper device outwardly of the associated grooves.

2. A conveyor according to claim 1, wherein each releasable coupling means comprises a generally U-shaped bendable rod, one arm of the U passing through an aperture in the associated abutment means within the V-section groove, the base of the U passing through an aperture in the keeper device and the other arm of the U being disposed adjacent the outer surface of the keeper device so as normally to hold the keeper device against movement away from the abutment means, said other arm being bendable into substantial alignment with the base of the U to permit disengagement of the keeper device from the coupling means and thus movement of the keeper device outwardly of the groove.

3. A conveyor according to claim 1, wherein each V-section groove includes second flange means longitudinally spaced from said first-mentioned flange means by a distance greater than the longitudinal dimension of an enlargement of the associated keeper device, said second flange means comprising a pair of vertically spaced abutment formations and the keeper device having, at each end thereof, an extension projecting longitudinally of the adjacent enlargement and fitting closely between the associated abutment formations.

4. A conveyor according to claim 3, wherein each extension of each keeper device is of progressively reducing vertical extent in the direction towards the free end thereof and wherein the dimensions of the first and second flange means are such that, during relative vertical movement of one pan end relative to the adjacent pan end, angular movement of the keeper device within the associated grooves is limited by engagement of the stem with the first flange means and by engagement of the extensions with the second flange means.

* * * * *